(12) United States Patent
Morisset

(10) Patent No.: US 9,688,196 B1
(45) Date of Patent: Jun. 27, 2017

(54) ALARM ACTIVATED SYSTEM WITH SNOW LEVEL SENSOR

(71) Applicant: Antonio Morisset, Randolph, MA (US)

(72) Inventor: Antonio Morisset, Randolph, MA (US)

( * ) Notice: Subject to any disclaimer, the term of this patent is extended or adjusted under 35 U.S.C. 154(b) by 0 days.

(21) Appl. No.: 15/255,622

(22) Filed: Sep. 2, 2016

(51) Int. Cl.
| G08C 19/16 | (2006.01) |
| B60Q 9/00 | (2006.01) |
| G08G 1/0962 | (2006.01) |
| F01N 13/08 | (2010.01) |
| F01N 13/00 | (2010.01) |

(52) U.S. Cl.
CPC ............ *B60Q 9/00* (2013.01); *F01N 13/008* (2013.01); *F01N 13/082* (2013.01); *G08G 1/0962* (2013.01)

(58) Field of Classification Search
CPC ............ G06F 12/0811; G06F 12/1009; G06F 2212/1028; G06F 3/0611; G06F 3/0625; G06F 3/0647; G06F 3/0673
USPC ........................................ 340/901, 902, 903
See application file for complete search history.

(56) References Cited

U.S. PATENT DOCUMENTS

| 3,801,779 | A | 4/1974 | Ver Sluis |
| 4,600,842 | A | 7/1986 | Boschung et al. |
| 6,057,769 | A | 5/2000 | Stevenson |
| 2012/0112920 | A1 | 5/2012 | Ramdeo |
| 2013/0019833 | A1* | 1/2013 | Li .................... F02M 35/10255 123/184.56 |
| 2014/0157621 | A1* | 6/2014 | Kim ........................ G06F 58/28 34/480 |
| 2015/0298654 | A1* | 10/2015 | Joao ........................ G01S 19/13 701/2 |
| 2016/0298336 | A1* | 10/2016 | Saksa .................... E04D 13/106 |

\* cited by examiner

*Primary Examiner* — Ojiako Nwugo
(74) *Attorney, Agent, or Firm* — Harpman & Harpman

(57) ABSTRACT

An apparatus for detecting the occurrence of snow above a preset level in relation to a combustion device outlet vent and inflow fresh air inlet providing a remote signal and alarm activation response thereto. A sensor arranged to project a distance determinating beam indicates the presence of snow and obstructions to a controller that selectively activates a light and sound alarm. Telecommunication from the integrated alarm provides wireless notification to remote locations that an event has occurred and remedial action is required.

9 Claims, 4 Drawing Sheets

ALARM ACTIVATED SYSTEM WITH SNOW LEVEL SENSOR

BACKGROUND OF THE INVENTION

1. Technical Field

This invention relates to sensor activated alarms that respond to a specific sensor input to detect snow levels and sound alarms to provide a warning if the sensor's predetermined protocols are reached. The alarm system of the invention overcomes issues associated with obstructed vents in heating systems and the like by applying real time monitoring of the status of outside inlet and outlet vents which if obstructed or blocked can lead to forcing carbon monoxide back into the structure.

2. Description of Prior Art

Prior art alarm systems provide for alarm activation, such as sound, light or telecommunications to warn of an event such as an access breach alarm for unauthorized entering of a structure. Examples of alarm detection systems can be seen in prior art U.S. Pat. Nos. 3,801,779, 4,600,842, 6,057,769 and U.S. Patent Publication 2012/0112920 A1.

In U.S. Pat. No. 3,801,779 a snow fall level detector can be seen that utilizes a light source and sensors with multiple baffles positioned at predetermined distances to the sensor. Snow accumulation blocks the light path activating the sensor.

U.S. Pat. No. 4,600,842 discloses a snowfall measuring device having a probe that descends to engage the snow. A light sensor determines the travel distance of the probe thereby indicating the effective level of the snow that has fallen or accumulated at that location.

U.S. Pat. No. 6,057,769 illustrates an intelligent alarm system with snow sensor. The system has an alarm clock that will be activated if a predetermined snow level is reached either earlier or later than the preset alarm time thereby alerting the user that snow of a specific depth has fallen in a pre-described time frame.

U.S. Patent Publication 2012/0112920 A1 a carbon monoxide and smoke alarm can be seen. A carbon monoxide and smoke detector are positioned within the building, responding therefore to both the presence of carbon monoxide levels and smoke. Upon activation, the system will send an alert to a remote location defining the activity alarm.

SUMMARY OF THE INVENTION

A snow alarm detection system that determines the presence of a snow level build-up that may block or impede the venting of products of combustion in a building heating system. A snow depth sensor is positioned on or near the vent preset to an activation level that would effectively block or impede the venting or alternately the intake of fresh air for combustion. An integrated command and control system thereby activates visual and audio alarms indicating that such blockage is taking place and may also be interfaced with a control board of a combustion heater source to deactivate or shut down the device if no response is made to alleviate the blockage after the alarm system has been activated and snow build up has been removed, for example.

DETAILED DESCRIPTION OF THE INVENTION

Figure 1:
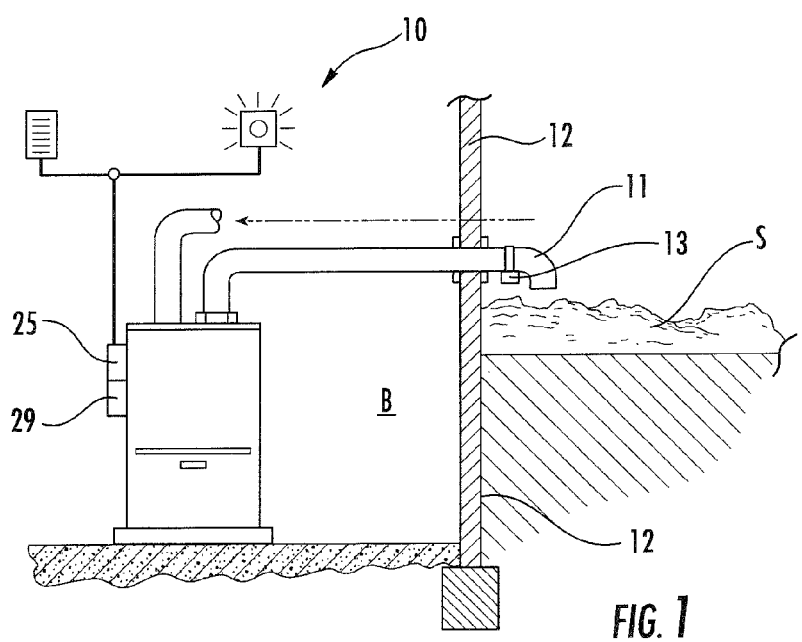
FIG. 1 is a graphic illustrational flow diagram that illustrates the system apparatus of the invention in a structural heating device.

Referring now to FIG. 1 of the drawings, a snow level alarm system 10 of the invention can be seen for detecting and warning of a potential blockage of a furnace vent 11 extending through an outside wall 12 of an illustrative structure B. The snow level alarm system 10 has a remote snow sensor 13 positioned on the furnace vent 11, best seen in FIGS. 2, 3 and 5 of the drawings by an adjustable strap mounting assembly 14. The strap mounting assembly has a strap 14A with oppositely disposed slotted ends 14B and 14C. The remote sensor 13 has an exterior housing 15 defining a top 16A, a bottom 16B, oppositely disposed ends 17 and 18.

Mounting fittings 19A and 19B extend from the respective spaced opposing housing ends 17 and 18.

Figure 2:
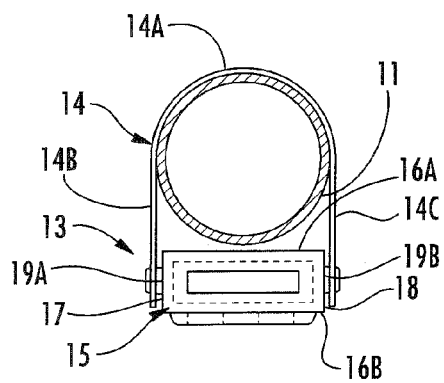
FIG. 2 is an enlarged front elevational view of a furnace vent with a snow depth sensor of the invention attached thereto.
Figure 3:
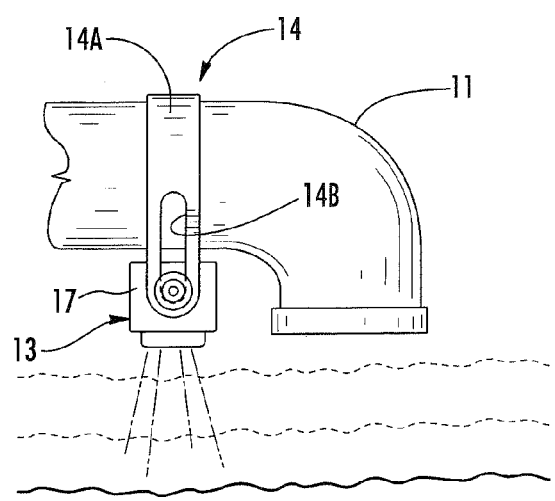
FIG. 3 is an enlarged side elevational view thereof.
Figure 4:
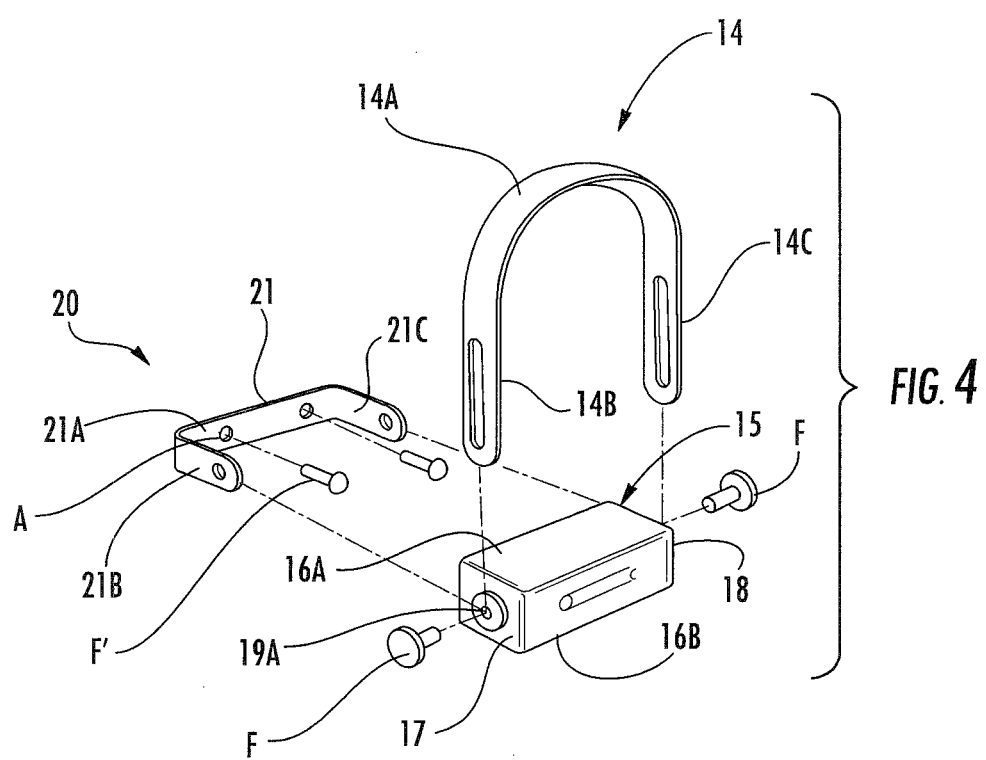
FIG. 4 is an exploded perspective assembly view of multiple sensor mounts of the invention.

The straps slotted ends 14B and 14C are therefore registerable over the respective mounting fittings 19A and 19B and secured thereto by threaded fasteners F for adjustable attachment to the furnace vent as best seen in FIGS. 2 and 3 of the drawings. An alternate sensor mount fitting 20 can be seen in composite exploded relation in FIG. 4 of the drawings illustrating a multiple assembly mounting configuration with the hereinbefore described single strap 14A.

The alternate sensor mounting fitting 20 is configured as a surface mount wall bracket 21 having an elongated U-shaped body member 21A with oppositely disposed longitudinally shaped arms 21B and 21C which are apertured inwardly of their respective free ends for engagement with and over the hereinbefore described sensor end mounts 19A and 19B and secured by fasteners F.

The wall bracket 21 has spaced surface attachment apertures A with fasteners F as will be understood by those skilled in the art for effective attachment to a variety of surfaces adjacent the venting outlet 11 as described. This alternate wall bracket 21 provides for an alternate positional mounting of the sensor 13 to accommodate different venting venues which may be encountered in the field. The sensor 13 may be therefore adjusted rotatably on its longitudinal axis within the wall bracket 21 or slotted strap ends 14B and 14C to provide for adaptive alternate positioning or adjusting the precise field of view of the sensor application, as required.

The sensor 13 may be of any applicable configuration that will detect to a preset distance determination of an object such as snow S, in this example, as seen in FIGS. 1-3 of the drawings or a foreign object, not shown.

Figure 6:
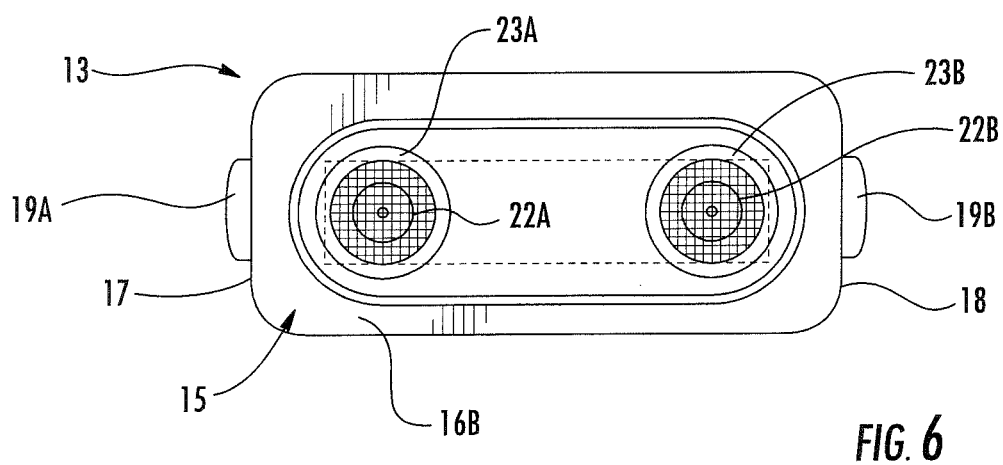
FIG. 6 is an enlarged bottom view of the snow depth sensor before installation.
Figure 7:
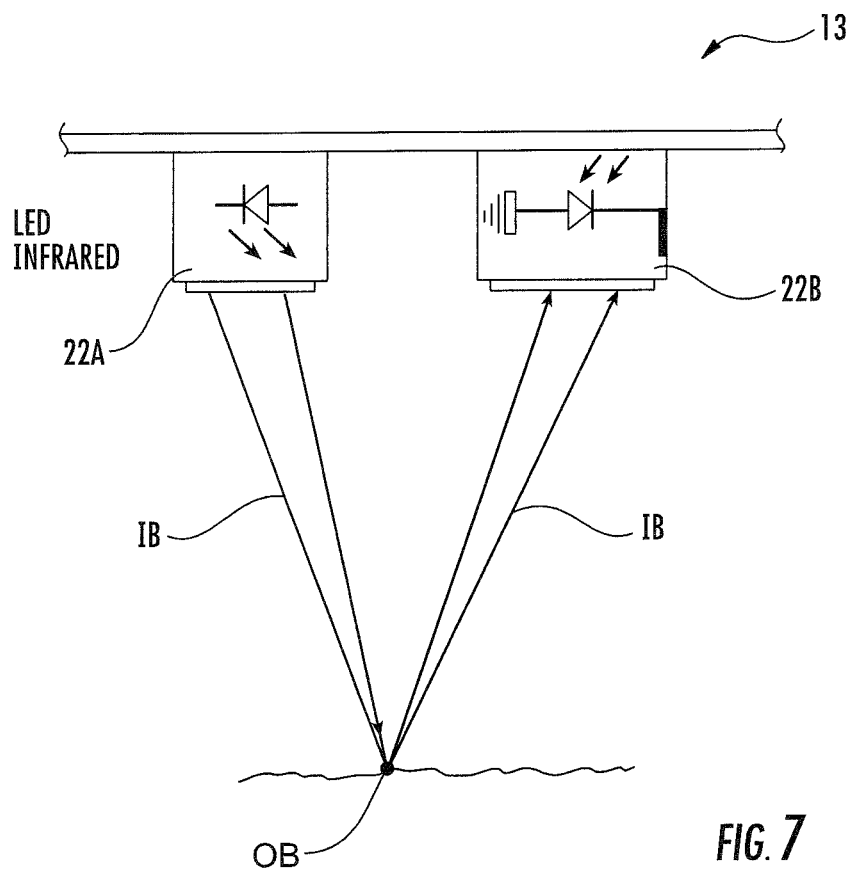
FIG. 7 is a graphic illustration of an infrared distance sensor.

Chosen for illustration in this example is a utilization of an infrared proximity sensor which typically has omitting and receiving infrared sensor fields which are well known in the art. Such an example of an infrared proximity sensor can be characterized as Sharp® Model No. GP2Y0A21YK which provides continuous real-time proximity distance determination which can be adapted to a preset distance, as noted, for the detection of snow S accumulating near the furnace vent 11. Such infrared proximity sensors, as noted, have a dedicated light emitter 22A and a receiver 22B within the housing openings 23A and 23B shown in FIG. 6 of the drawings and graphically in FIG. 7 of the drawings which illustrate the workability of such infrared sensors indicating an infrared beam IB travel path to and reflected from an object representation OB.

Figure 5:
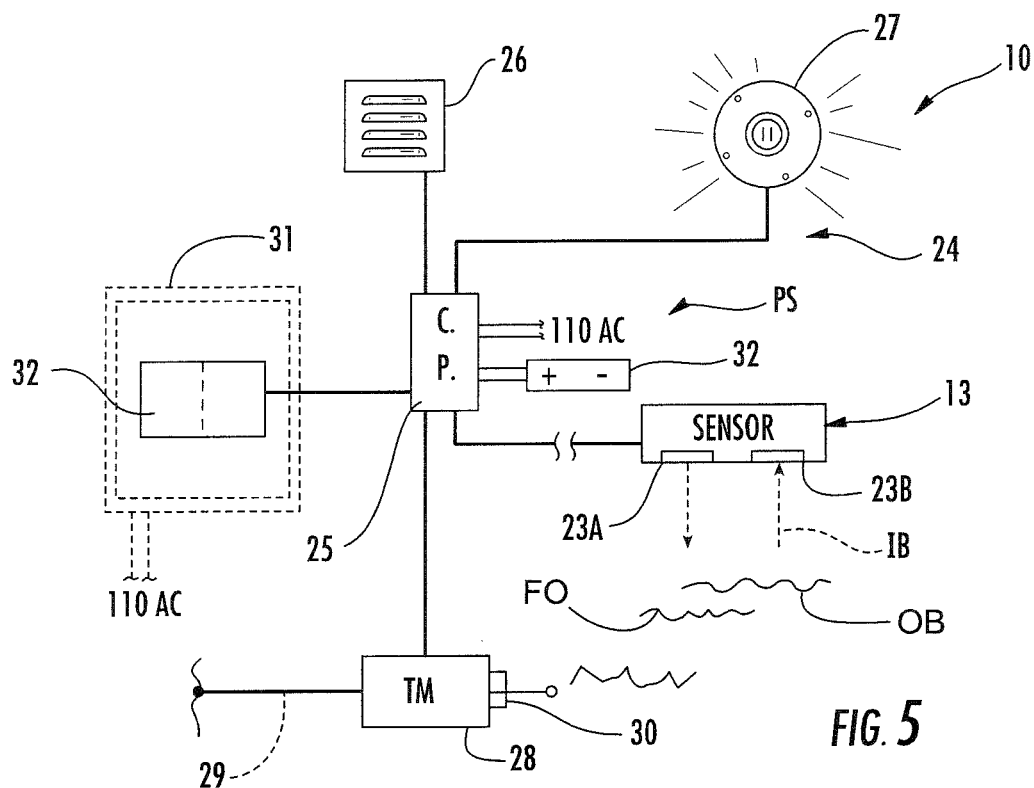
FIG. 5 is a block flow command and control diagram illustrating the aspects of the invention.

A power source PS and determined control circuit 24 for the system are positioned remotely in a command and control module 25 as best seen in FIG. 5 of the drawings.

In operation, input from the sensor 13 in response to snow level accumulation is received by the control and command module 25, interpreted by the control circuit 24 which contains a microprocessor for select alarm activation and sequence.

Alarms can be characterized as an audio alarm 26 and a visual light alarm 27 which are shown in FIGS. 1 and 5 of the drawings and may be positioned anywhere within the structure B. Such alarms so activated will require immediate response by the user in the form of remedial action clearly accumulated snow S below the sensor 13. Alternately, a foreign object FO blocking the vent 11 can also be detected and cleared after the warning alarm has been activated. Once the snow or object to be cleared has been achieved, the system can be reset, thus confirming the safe status thus achieved.

Additionally, a telecommunication alarm option is provided having a communications module 28 in communication with the command and control module 25. The communications module 28 is interfaced with a traditional telephone line indicated at 29 and a cellular phone access portal 30 indicated symbolically in FIG. 5 of the drawings. Such cellular alarm communication may initiate a text or simple pre-recorded voice mail message and internet to alert the user, not shown, that there is a problem at the monitored location that requires immediate attention and action.

The system of the invention has a failsafe control and command output which is an interface with a combustion heating appliance 31 in this example a furnace shown in broken lines via a control panel 32 as shown in FIG. 5 of the drawings and graphically in FIG. 1 of the drawings. The failsafe control will shut down the appliance 31 if no remedial action is taken as hereinbefore described.

The alarm system 10 confirms a failsafe shut down and message communication via a telecommunication module 27. Additionally, a battery backup 32 for the alarm system 10 is provided to assure alarm activation.

It will be seen therefore that the snow alarm detection system of the invention will respond to multiple alarms and notification of a restricted or soon to be blocked eating system vent 11 and alternately a fresh air intake.

It therefore effectively protects users such as homeowners from harmful carbon monoxide accumulation due to a blocked vent system. It also allows users time to unclear the vents or pipes before the heating system shuts down. It provides dual telecommunication notification in the event of no remedial corrective action a failsafe shut down protocol in order to avert a possible lethal collection and concentration of carbon monoxide within the building.

Figure 8:
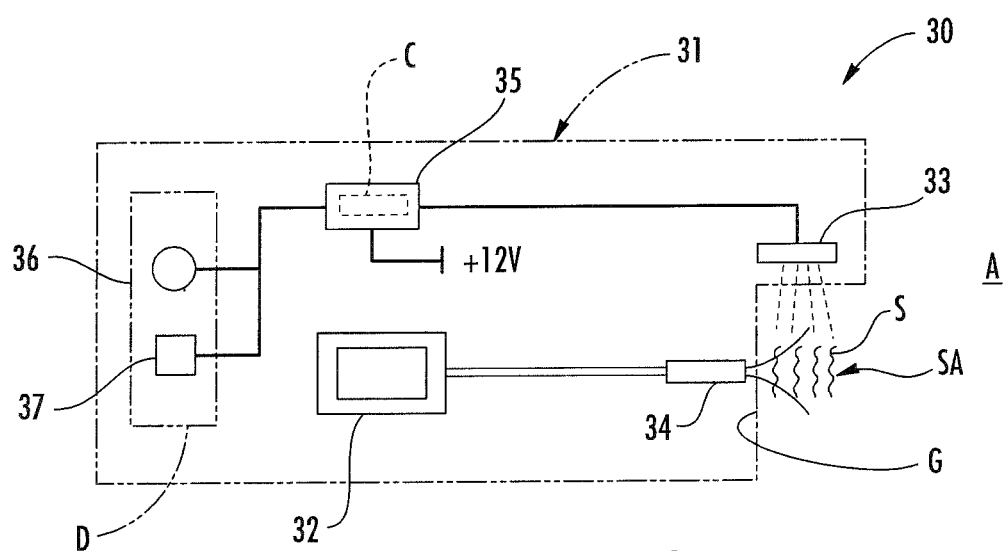
FIG. 8 is a block flow diagram of an alternate use application in a vehicle.

Referring now to FIG. 8 of the drawings, an alternate use application of the snow level and obstruction alarm system 30 of the invention is shown applied to a vehicle 31 indicated by broken lines with an internal combustion engine 32.

A remote detection sensor 33 of the system, such as infrared as hereinbefore described in the primary form of the invention is positioned for detecting the accumulation of material, such as snow S, chosen for this illustration adjacent the exhaust pipe outlet 34 of the vehicle 31.

The exhaust gas G from the engine 32 is shown with the potential to restrict and block from atmosphere A the exhaust gas by the snow accumulation illustrated as SA.

It will be seen therefore that the sensor 33 is in communication with a system detection controller 35 having an activation logic circuit C for warning alarm sequence including, but not limited to, a visual light 36 and warning sound emulator 37 on the vehicle dash D indicated by broken inclusion lines within the vehicle 31.

It will be apparent that other applications may be adapted to the alarm detection system of the invention utilizing a variety of venue applicable circuits, not shown, as will be understood by those skilled in the art.

It will thus be seen that a new and novel alarm activation system with snow level sensor has been illustrated and described and it will be apparent to those skilled in the art that various changes and modifications may be made therein without departing from the spirit of the invention.

Therefore, I claim:

1. An alarm system for detecting environmental conditions outside the building comprises,
    a remote sensor for measuring the proximity of material accumulation blocking an outside vent provided for the products of combustion,
    a control and command circuit in communication with said sensor,
    an alarm in communication with said command and control circuit activated thereby in response to data input from the remote sensor.

2. The alarm system set forth in claim 1 wherein said remote sensor capable of detecting the presence of snow accumulation outside the building.

3. The alarm system set forth in claim 1 wherein said alarm comprises, an audible alarm and a visual alarm.

4. The alarm system set forth in claim 1 wherein said remote sensor comprises,
    an infrared sensor with emitter and receiving elements and means for measuring reflectance at a focus point in relation to said outside vents.

5. The alarm system set forth in claim 1 wherein said control and command circuit comprises,
    a microprocessor for receiving data signals from said remote sensor,
    said microprocessor processing said data and generating alarm signal in response thereto.

6. The alarm system set forth in claim 1 wherein said alarm is in communication with said control and command circuit further comprises,
    a telecommunication module, said module having a telephone, internet and wireless communication links therein and a source of power for said telecommunication module.

7. The alarm system set forth in claim 1 wherein said remote sensor further comprises,
    an adjustable strap mount assembly with a strap overlying said outside vent, slotted openings in said strap engageable over end mounts on said sensor.

8. The alarm system set forth in claim 1 further comprises, an adjustable bracket mount for said sensor having oppositely disposed apertured arms registerable over mounts on said sensor.

9. An alarm detection system for environment conditions capable of blocking a vehicle's exhaust outlet comprising,
a remote sensor for measuring the proximity of accumulating material blocking exhaust gas from atmosphere,
a detection controller in communication with said remote sensor,
an activation alarm warning circuit within said detection controller,
a warning alarm in communication with said activation alarm warning circuit,
said warning alarm in said vehicle comprising a visual and audio indicator that a vehicle exhaust outlet has been blocked.

\* \* \* \* \*